United States Patent Office 3,256,083
Patented June 14, 1966

3,256,083
METHOD AND COMPOSITIONS FOR TREATING SOIL TO SUPPRESS THE NITRIFICATION OF AMMONIUM NITROGEN THEREIN
Cleve A. I. Goring, Garden Grove, Calif., assignor to The Dow Chemical Company, Midland, Mich., a corporation of Delaware
No Drawing. Filed Dec. 8, 1961, Ser. No. 158,138
12 Claims. (Cl. 71—1)

This application is a continuation-in-part of copending application Serial No. 24,226, filed April 25, 1960, now abandoned.

The present invention relates to crop culture and is particularly concerned with a new agronomical practice and composition for conserving soil nitrogen and for supplying the soil nitrogen requirements for plant nutrition.

Since the majority of plants obtain most or all of their nitrogen requirements from the soil, the adequate provision of nutrient nitrogen in soil for plant growth is one of the foremost agronomic problems. The nitrogen in the soil is found to occur primarily in three forms: organic nitrogen, ammonium nitrogen and nitrate nitrogen, of which ammonium nitrogen and nitrate nitrogen are the primary forms utilized by plants. This nitrogen is absorbed by plants in solution from the soil in the form of ammonium ions and nitrate ions.

The organic nitrogen in the soil consists of a large number of nitrogen containing materials, primarily of reduced nitrogen compounds originating from animal tankages, fish products, green manure, crop residues, organic chemical fertilizers or bacterial syntheses. With the exception of certain of the chemical fertilizers such as urea, the solubility of these organic nitrogen compounds in water is very low. While they are not readily leached from the soil, neither are they directly available to the plants for use. The nitrogen in the organic nitrogen compounds is made available to plants where the nitrogen therein is converted by soil bacteria to inorganic nitrogen compounds. The first inorganic nitrogen product of such bacterial action is ammonia or ammonium salts. This conversion takes place very rapidly from fertilizers such as urea and slowly from many other organic nitrogen compounds. The ammonia or ammonium nitrogen thus produced is very rapidly oxidized by soil bacteria to inorganic nitrate nitrogen. In this process, the ammonium nitrogen is first oxidized to the intermediate nitrite nitrogen which is then rapidly oxidized to nitrate nitrogen. This mineralization of organic nitrogen constantly replenishes the soil with nitrogen available for plant absorption.

The ammonium nitrogen in the soil is derived from bacterial conversion of organic nitrogen or from the added reduced nitrogen fertilizers such as anhydrous ammonia, aqueous ammonia, ammonium phosphate, ammonium nitrate, ammonium chloride and ammonium sulfate, as well as from other ammonium salts of organic and inorganic acids, and inorganic reduced nitrogen compositions, such as nitrogen-phosphorus inorganic complexes. These ammonium compounds or inorganic reduced nitrogen compounds are readily soluble in water or aqueous soil medium. When in solution, the reduced nitrogen occurs largely as the ammonium ion. Due to the cationic nature of this ion, the ion is strongly adsorbed on the soil colloids or base exchange complex of the soil. This colloidal-bound ammonium nitrogen exists in equilibrium with a small concentration of ammonium ions in the soil solution. Thus, the colloidal-bound ammonium nitrogen provides a dynamic nitrogen reservoir to maintain a supply of ammonium ions in the soil solution for plant absorption. Further, since the ammonium nitrogen in the soil occurs principally as colloidal-bound nitrogen, only very small quantities of the ammonium form of soil nitrogen are lost from the feeding zone of the plants by leaching.

The nitrate nitrogen in the soil is derived from the oxidation or nitrification of ammonium nitrogen by soil bacteria as previously described, or by the addition of inorganic nitrate fertilizers such as ammonium nitrate, sodium nitrate, potassium nitrate and calcium nitrate. The inorganic nitrate compounds are readily soluble in water and the aqueous soil medium. When so dissolved, the nitrate nitrogen largely exists as the nitrate ion. Because of the anionic nature of this ion, nitrate nitrogen is not absorbed by soil colloids. Accordingly, the nitrate nitrogen is rapidly leached by rainfall and irrigation and readily lost from the feeding zone of the plants. Further, the nitrate nitrogen is reduced by many soil bacteria to nitrogen gas. The latter process is known as denitrification and accounts for an additional loss of large quantities of nitrate nitrogen from the soil. The yearly loss from leaching and denitrification amounts to from 20 to 80 percent of the nitrate nitrogen found in the soil, whatever its source.

Nitrification or the conversion of the ammonium nitrogen in soil to nitrate nitrogen by bacterial action occurs at a rate which is dependent primarily upon the soil temperature and the soil pH. The rate is also somewhat dependent upon the type of soil and the moisture content of the soil. The rate of nitrification is rapid when the soil temperature is at least 10° C. and the soil pH is at least 5. For example, the conversion of ammonium nitrogen to nitrate nitrogen in sand, silt or clay loam soil having a pH of at least 6 may take place at a rate of from 20 pounds of nitrate nitrogen per acre per week at 10° C., to 500 pounds of nitrate nitrogen per acre per week at 35° C. Even at temperatures as low as 2° C., nitrification will oftentimes occur in such soils at a rate of 25 pounds of nitrate nitrogen per month. Thus, ammonium nitrogen is very rapidly changed to nitrate nitrogen in most agricultural soils.

The rapid nitrification of ammonium nitrogen in soil and the subsequent leaching and bacterial decomposition of nitrate nitrogen have depleted many agricultural soils of the nitrogen reserves and nitrogen requirements for plant nutrition. In order to replenish the soil nitrogen, agriculturalists have resorted to use of large amounts of nitrate fertilizers and reduced nitrogen fertilizers. In many instances, multiple fertilizer treatments during the growing season have been required to maintain adequate nitrogen requirements for plant growth. In this practice, the greater proportion of the employed fertilizers is in the form of reduced nitrogen fertilizers. The expression "reduced nitrogen fertilizers" is employed as understood in the art and embraces both inorganic and organic nitrogenous materials containing nitrogen in the reduced state. Examples of known reduced nitrogen fertilizers include anhydrous and aqueous ammonia, inorganic ammonium salts such as ammonium phosphate, ammonium nitrate and ammonium sulfate, ammonium salts of organic acids, urea, cyanamide, guanidine nitrate, dicyandiamide, amino acids, guanyl urea sulfate, thiourea, uramon, amines, ureaform and other nitrogen containing organic chemical fertilizers as well as protein mixtures, animal tankages, green manure, fish products, crop residues, and other natural materials known to be sources of ammonium ions in soil. These fertilizer materials contain nitrogenous compounds in which the apparent valency or oxidation state of the nitrogen is from −3 to −1, inclusive. The organic nitrogenous materials are converted in soil to ammonia or ammonium ions. The conversion takes place readily with highly water-soluble materials such as urea but more slowly with cyanamide and many organic nitrogen fertilizers. Inasmuch as the following equilibrium exists in the presence of water even when the latter is present in minor proportions $$NH_3 + H_2O \rightleftharpoons NH_4OH \rightleftharpoons NH_4^+ + OH^-$$

it is to be understood that when reference is made to either ammonium ion or ammonia in soil it is meant to embrace the other component, namely, ammonia or ammonium ion, respectively.

Since the nitrogen must be present as nitrate nitrogen before substantial quantities can be leached from the soil or lost by denitrification, application of nitrogen as reduced introgen fertilizers provides the agriculturalist with a short interval during which available reduced nitrogen is at a maximum and conditions for leaching and denitrification are at a minimum. This interval is particularly advantageous during the initial growth of seeds and emerging seedlings when high soil nitrogen concentrations are very desirable. In addition, the ammonium nitrogen absorbed by plants is immediately available for assimilation into organic materials being synthesized thereby. In contrast, the nitrate nitrogen must be reduced before it can be assimilated in the synthesis of plant materials. This reduction is carried out in the plant usually at the expense of synthesized carbohydrate. Although some plants seem to do well on either ammonium nitrogen or nitrate nitrogen as a source of nitrogen nutrients, many plants such as potato, corn, rice, buckwheat, pineapple, cotton and orange prefer ammonium nitrogen and appear to grow best in the presence of substantial amounts of this form of nitrogen. Thus, the need for a method of suppressing the rapid loss of soil nitrogen is well recognized by agriculturalists.

An object of the present invention is to provide a new and improved agronomic practice for conserving soil nitrogen. A further object is the provision of a new and improved method for suppressing the loss of soil nitrogen. An additional object is the provision of a new and improved method for suppressing the loss of ammonium nitrogen from growth medium. Another object is the provision of a new and improved method for supplying growth medium with nitrogen available for plant growth. Another object is the provision of a new and improved method for suppressing the loss of reduced nitrogen fertilizer supplements from soil. An additional object is the provision of a new and improved method for suppressing the nitrification of ammonium nitrogen in soil. Another object is the provision of a new and improved method for suppressing the conversion in soil of ammonium ions to nitrate ions. An additional object is the provision of novel compositions to be employed in the new methods of the present invention. Other objects will become apparent from the following specifications and claims.

The new agronomical practice for improving plant nutrition and conserving soil nitrogen comprises treating plant growth medium with an N-nitroso compound corresponding to the formula $$Z-N=O$$

In this and succeeding formulas, Z is selected from the radicals having the formulas

and

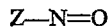

in which A may be lower alkyl, phenyl, tolyl or chlorophenyl, B is lower alkyl and R may be 1-piperidyl, 1-pyrrolidyl, 4-morpholinyl, 1-pyrrolinyl and hexamethyleneimino. Lower alkyl as above employed is meant to be a radical containing from 1 to 2 carbon atoms, inclusive. The nitroso compounds are yellow to red liquids or low melting solids adapted to be readily and conveniently distributed in growth medium.

By the practice of this invention, the nitrification of ammonium nitrogen in the soil to nitrate nitrogen is suppressed thereby preventing the rapid loss of ammonium nitrogen from the growth medium. Furthermore, by proper distribution of the N-nitroso compounds, this action of inhibiting the transformation of ammonium nitrogen to nitrate nitrogen is effective over a prolonged period of time. The ammonium nitrogen may arise from added ammonium nitrogen fertilizers or be formed in the soil by conversion of the organic nitrogen constituents found in soil or added thereto as components of organic fertilizers.

The provision of an effective dosage of the N-nitroso compound in the soil or growth medium is essential for the practice of the present invention. In general, good results are obtained when the growth medium is impregnated with the N-nitroso compound in an amount of from about 0.2 part to about 4000 parts or more by weight per million parts by weight of growth medium. (Hereinafter, the abbreviation p.p.m. when employed is meant to designate parts by weight of N-nitroso compound per million parts by weight of soil or growth medium.) The preferred amounts to be employed are dependent upon the particular situation. Thus, in determining the amounts to be employed, consideration is made not only of the treatment need, i.e., soil pH, temperature, soil type, etc., but also of the mode of application to soil. When the N-nitroso compound is to be applied in a broadcast application, the amount in p.p.m. may frequently be less than in row or band application where for a substantial depth and width within the vicinity of application there may be a very high concentration of the N-nitroso compound. When application is made near the root zone of growing plants or when application is made immediately prior to seeding or transplanting, the amounts supplied are frequently at a lower rate than when application is made at the end of the growing season to prepare the soil for the following season. By dispersing very large dosages in growth medium, a prolonged inhibition of nitrification may be obtained over a period of many months. The concentration of the acetive N-nitroso compound is eventually reduced to a minimum by decomposition in the soil.

In one method for carrying out the present invention, the N-nitroso compound is distributed throughout soil or growth medium in a broadcast application such as by spraying, dusting, distributing an irrigation water, etc. In such application, the N-nitroso compound is supplied in amounts sufficient to permeate the growing area thereof with an amount of from about 0.2 to about 1000 p.p.m. In field administration, the N-nitroso compound may be distributed in the soil in the amount of at least 0.05 pound per acre and through such cross-section of the soil as to provide for the presence therein of an effective concentration of the agent. It is usually preferred that the N-nitroso compound be distributed to a depth of at least two inches below the soil surface and at a dosage of at least 0.1 pound per acre inch of soil.

In another method for carrying out the present invention, the N-nitroso compound is administered to growth medium in a band or row application. In such application, administration is made with or without carrier in amounts sufficient to supply to soil or growth medium a concentration of the N-nitroso compound which may be as high as 4000 p.p.m. or more. After administration, with or without discing or dragging, subsequent irrigation or rainfall distributes the N-nitroso compound throughout the growth medium.

In one embodiment of the present invention, the N-nitroso compound is distributed throughout the growth medium prior to seeding or transplanting the desired crop plant.

In another embodiment, the soil in the root zone of growing plants is treated with the N-nitroso compound in an amount effective to inhibit nitrification but sublethal to plant growth. In such operations, the compounds should be supplied in the soil in amounts of at least 2 p.p.m. and which have preferred upper limits of about 50 p.p.m. By following such practice, no adverse effect is exerted by the N-nitroso compound upon growth of seeds or plants. Oftentimes, it is desirable to treat the soil adjacent to plants, and this procedure may be carried out conveniently in side-dressing operations.

In a further embodiment, soil may be treated with the N-nitroso compound following harvest or after fallowing to prevent rapid loss of ammonium nitrogen and to build up the ammonium nitrogen formed by conversion of organic nitrogen compounds. Such practice conserves the soil nitrogen for the following growing season. In such application, the upper limit is primarily an economic consideration.

In an additional embodiment, the soil is treated with the N-nitroso compound in conjunction with the application of reduced nitrogen fertilizers. The treatment with the N-nitroso compound may be carried out prior to, subsequent to or simultaneously with the application of fertilizers. Such practice prevents the rapid loss of the ammonium nitrogen added as fertilizer and the ammonium nitrogen formed from the organic reduced nitrogen in fertilizers by the action of soil bacteria. The administration to the soil of the N-nitroso compound as a constituent of an ammonium nitrogen fertilizer composition constitutes a preferred embodiment of the present invention.

The present invention may be carried out by distributing the N-nitroso compound in an unmodified form through growth medium. The present method also embraces distributing the compound as a constituent in liquid or finely divided solid compositions. In such practice, the N-nitroso compound may be modified with one or more additaments or soil treating adjuvants including water, petroleum distillates or other liquid carriers, surface-active dispersing agents, finely divided inert solids and nitrogen fertilizers. Depending upon the concentration of the N-nitroso compound, such augmented compositions may be distributed in the soil without further modifications or be considered concentrates and subsequently diluted with additional inert carrier to produce the ultimate treating compositions. The required amount of the N-nitroso compound may be supplied to growth media in from 1 to 50 gallons of organic solvent carrier, in from 5 to 27,000 or more gallons of aqueous carrier, or in from about 20 to 2,000 pounds of solid carrier per acre treated. When an organic solvent carrier is employed, it may be further dispersed in the above volume of aqueous liquid carrier.

The concentration of N-nitroso compound in compositions to be employed for the treatment of growth media is not critical and may vary considerably provided the required dosage of effective agent is supplied to the growth media. The concentration of the N-nitroso compound may vary from 0.0001 percent by weight to 95 percent by weight of the composition, depending on whether the composition is a treating composition or a concentrate composition and whether it is in the form of a solid or a liquid. In aqueous liquid treating compositions, concentrations of from 0.0001 percent to 0.25 percent by weight of the N-nitroso compound is preferred. The concentration of the N-nitroso compound in organic solvents may be from 2.0 to 50 percent by weight. Concentrate liquid compositions generally contain from 2.5 to 50 percent by weight of the N-nitroso compound. Solid compositions may contain the N-nitroso compound in amounts as high as 95 percent by weight. Treating compositions generally contain 0.001 percent to 10 percent by weight of the N-nitroso compound. Concentrate compositions contain from 2.5 to 95 percent of the N-nitroso compound.

Liquid compositions containing the desired amount of the N-nitroso compound may be prepared by dispersing the latter in one or more liquid carriers such as water or an organic solvent, with or without the aid of a suitable surface-active dispersing agent or emulsifying agent. Suitable organic solvents include acetone, diisobutylketone, methanol, ethanol, isopropyl alcohol, diethyl ether, toluene, methylene chloride, chlorobenzene and the petrolum distillates. The preferred organic solvents are those which are of such volatility that they leave little permanent residue in the soil. When the solution of N-nitroso compound in organic solvents is to be further diluted to produce aqueous dispersions, the preferred solvents include acetone and the alcohols. When the liquid carrier is entirely organic in nature, particularly desirable carriers are the petroleum distillates boiling almost entirely under 400° F. at atmospheric pressure and having a flash point above about 80° F. Dispersing and emulsifying agents which may be employed in liquid compositions include condensation products of alkylene oxides and phenols and organic acids, alkyl aryl sulfonates, polyoxyalkylene derivatives of sorbitan esters, complex ether alcohols, mahogany soaps and the like. The surface-active agents are generally employed in the amount of from 1 to 20 percent by weight of the N-nitroso compound.

Solid compositions containing the active N-nitroso compound may be prepared by dispersing the latter in finely divided inert solid carriers such as talc, chalk, gypsum, vermiculite, bentonite and the like, fuller's earth, attapulgite and other clays, various solid detergent dispersing agents and the solid fertilizer compositions. In preparing such compositions, the carrier is mechanically ground with the N-nitroso compound or wet with a solution thereof in a volatile organic solvent. Depending upon the proportions of ingredients, these compositions may be employed without further modification or be considered concentrates and subsequently diluted with solid surface-active dispersing agent, talc, chalk, gypsum or the like to obtain the desired treating composition. Furthermore, such concentrate compositions may be dispersed in water with or without added dispersing agent or agents to prepare aqueous soil treating compositions.

Soil treatment compositions may be prepared by dispersing the N-nitroso compound in fertilizers such as ammonium fertilizer or organic nitrogen fertilizer. The resulting fertilizer compositions may be employed as such or may be modified as by dilution with additional nitrogen fertilizer or with inert solid carrier to obtain a composition containing the desired amount of the N-nitroso compound for treatment of soil. Further, an aqueous dispersion of the N-nitroso compound containing fertilizer compositions may be prepared and administered to the growth medium. Fertilizer compositions comprising the N-nitroso compound in intimate admixture with ammonium fertilizers constitute preferred embodiments of the present invention.

In fertilizer compositions comprising reduced nitrogen fertilizer, it is desirable that the N-nitroso compound be present in an amount of at least about 0.05 percent by weight based on the weight of the nitrogen present in the fertilizer as reduced nitrogen and may be present in amounts as high as 95 percent by weight of the reduced nitrogen in the fertilizer. When a fertilizer composition contains both reduced nitrogen and other forms of nitrogen such as in the case of ammonium nitrate fertilizer compositions, the amount of N-nitroso compound is based on the weight of nitrogen present in the ammonium component.

In operations carried out in accordance with the present invention, the soil may be impregnated in any convenient fashion with the N-nitroso compound or a composition containing the latter. For example, these modified or unmodified compositions may be mechanically mixed with the soil; applied to the surface of soil and thereafter dragged or disced into the soil to a desired depth; or transported into the soil with a liquid carrier such as by injection, spraying or irrigation. When the distribution is carried out by introducing the N-nitroso compound in the water employed to irrigate the soil, the amount of water is varied in accordance with the moisture content of the soil in order to obtain a distribution of the N-nitroso compound to the desired depth. The N-nitroso compound may be readily and conveniently distributed to a depth of a few inches to four feet by irrigation methods. The preferred methods embrace procedures using any of these steps or combination of steps wherein the compounds are distributed in the soil substantially simultaneously with a reduced nitrogen fertilizer.

The following examples illustrate the invention but are not to be construed as limiting.

EXAMPLE 1

An aqueous ammonium fertilizer composition containing 500 parts by weight of nitrogen and 25 parts by weight of N-methyl-N-nitrosoaniline per million parts of aqueous media was prepared by dispersing a 2 percent (weight by volume of solvent) acetone solution of N-methyl-N-nitrosoaniline in aqueous ammonium sulfate solution. (The amount of nitrogen in all examples is based on the nitrogen present in the fertilizer in the reduced form.)

The composition so prepared was employed to treat seed beds of sandy loam soil having a pH of about 8, containing essentially no organic material, and having been freed of nitrite and nitrate nitrogen by prior thorough leaching with water. In the treating operation, the composition was applied to the seed beds as a soil drench in a manner suitable for insuring a substantially uniform distribution of the composition throughout the soil. The amount of composition employed was sufficient to supply 100 parts by weight of nitrogen and 5 parts by weight of N-methyl-N-nitrosoaniline per million parts by weight of soil. In a check operation, other seed beds similarly prepared were fertilized with a similar aqueous fertilizer composition containing the same amount of acetone and ammonium sulfate but no N-methyl-N-nitrosoaniline. The composition was applied in an amount sufficient to supply the same concentration of nitrogen to the soil as the treating composition containing N-methyl-N-nitrosoaniline. The soil temperature of all seed beds was maintained at about 70° F. for the period of the determination.

At various intervals following treatment, samples of soil were taken from the different seed beds and the extent of nitrification of the added ammonium sulfate fertilizer determined by analyses for combined nitrate plus nitrite nitrogen. The determinations were carried out by extracting the nitrate and nitrite from the soil with a saturated calcium sulfate solution, developing color in the clear supernatant of the extract with diphenylamine in sulfuric acid, and comparing the color with a standard solution containing known concentrations of nitrate and nitrite ions. This procedure is similar to that described in "Colorimetric Methods of Analysis" by F. D. Snell and C. T. Snell, D. Van Nostrand Company, Inc., volume II, 3rd edition, page 801.

The percent nitrification in the seed beds of the added ammonium sulfate at various intervals is set forth in the following table:

Table I

| Interval Following Treatment in Days | Percent Nitrification | |
|---|---|---|
| | Soil Treated With Ammonium Sulfate+N-Methyl-N-nitrosoaniline | Soil Treated With Ammonium Sulfate (Check) |
| 7 | 0 | 100 |
| 14 | 15 | 100 |
| 21 | 15 | 100 |

EXAMPLE 2

In a similar operation, an aqueous ammonium sulfate solution and an acetone solution containing 2 percent (weight by volume of solvent) of N-nitrosodimethylamine was dispersed in water to prepare aqueous compositions containing 500 parts by weight of nitrogen and 25 parts by weight of the N-nitroso compound per million parts by weight of ultimate mixture. This composition was employed to treat sandy loam soil as described in Example 1, in an amount sufficient to provide 100 parts by weight of nitrogen and 5 parts by weight of the N-nitroso compound per million parts by weight of soil. The degree of nitrification was determined after an interval of 10 days and 14 days and found to be 15 percent and 25 percent, respectively. A check operation carried out employing a similar aqueous fertilizer composition but containing no N-nitrosodimethylamine showed 100 percent nitrification at both intervals.

EXAMPLE 3

In a similar manner, an aqueous ammonuim sulfate solution and an acetone solution containing 2 percent (weight by volume of solvent) of N-nitrosopiperidine was dispersed in water to prepare aqueous composition containing 500 parts by weight of nitrogen and 25 parts by weight of the N-nitroso compound per million parts by weight of the ultimate mixture. This composition was employed to treat sandy loam soil as described in Example 1, in an amount sufficient to provide 100 parts by weight of nitrogen and 5 parts by weight of the N-nitroso compound per million parts by weight of soil. A check operation was simultaneously carried out employing a similar composition but containing no N-nitrosopiperidine. The degree of nitrification was determined after an interval of 14 and 21 days and found to be 15 percent and 25 percent, respectively. A check operation carried out employing a similar ammonium sulfate composition but containing no N-nitrosopiperidine showed 100 percent nitrification at both intervals.

EXAMPLE 4

In similar operations, an aqueous ammonium sulfate solution and a series of acetone solutions containing 4 percent (weight by volume of solvent) of one N-nitroso compound were dispersed in water to prepare a series of aqueous compositions containing 1000 parts by weight of nitrogen and 50 parts by weight of an N-nitroso compound in a million parts by weight of ultimate mixture. These compositions were employed to treat sandy loam soil in an amount sufficient to provide 200 parts by weight of nitrogen and 10 parts by weight of an N-nitroso compound per million parts by weight of soil. A check operation was carried out employing a similar aqueous ammonium sulfate composition but containing no N-nitroso compound. The extent of nitrification was determined at random intervals in a manner previously described. The results are given in Table II.

Table II

| N-Nitroso Compound in Treating Composition | Interval Following Treatment in Days | Percent Nitrification | |
|---|---|---|---|
| | | Soil Treated With Ammonium Sulfate plus N-nitroso Compound | Soil Treated With Ammonium Sulfate (Check) |
| N-methyl-N-nitroso-aniline | 7 | 5 | 75 |
| Do | 14 | 5 | 100 |
| Do | 21 | 10 | 100 |
| Do | 28 | 10 | 100 |
| Do | 37 | 10 | 100 |
| Do | 43 | 10 | 100 |
| N-nitroso-N-methyl-aniline | 50 | 30 | 100 |
| Nitrosodimethyl-amine | 7 | 5 | 75 |
| Do | 14 | 5 | 100 |
| Do | 21 | 5 | 100 |
| Do | 28 | 10 | 100 |
| Do | 37 | 10 | 100 |
| Do | 43 | 10 | 100 |
| Do | 50 | 15 | 100 |
| Do | 58 | 15 | 100 |
| N-nitrosopiperidine | 7 | 5 | 75 |
| Do | 14 | 5 | 100 |
| Do | 21 | 10 | 100 |
| Do | 28 | 20 | 100 |
| Do | 37 | 30 | 100 |

EXAMPLE 5

In similar operations, an aqueous ammonium sulfate solution and a series of acetone solutions containing 4 percent (weight by volume of solvent) of one N-nitroso compound were dispersed in water to prepare a series of aqueous compositions containing 500 parts by weight of nitrogen and 25 parts by weight of an N-nitroso compound in a million parts of ultimate mixture. These compositions were employed to treat sandy loam soil in an amount sufficient to provide 100 parts by weight of nitrogen and 5 parts by weight of N-nitroso compound per million parts by weight of soil. A check operation was carried out employing a similar aqueous ammonium sulfate composition but containing no N-nitroso compound. The extent of nitrification was determined at different intervals in a manner previously described. The results are given in Table III.

Table III

| Treating Composition | Interval Following Treatment in Days | Percent Nitrification |
|---|---|---|
| Ammonium sulfate + N-ethyl-N-nitrosoaniline | 7 | 0 |
| Ammonium sulfate (check) | 7 | 100 |
| Ammonium sulfate + N-nitrosopyrrolidine | 7 | 0 |
| Ammonium sulfate (check) | 7 | 100 |
| Ammonium sulfate + N-nitrosopyrrolidine | 14 | 0 |
| Ammonium sulfate (check) | 14 | 100 |
| Ammonium sulfate + N-nitrosopyrrolidine | 21 | 5 |
| Ammonium sulfate (check) | 21 | 100 |
| Ammonium sulfate + N-methyl-N-nitroso-m-chloroaniline | 7 | 15 |
| Ammonium sulfate (check) | 7 | 100 |
| Ammonium sulfate + N-methyl-N-nitroso-m-toluidine | 7 | 15 |
| Ammonium sulfate (check) | 7 | 100 |
| Ammonium sulfate + N-nitrosomorpholine | 7 | 0 |
| Ammonium sulfate (check) | 7 | 100 |
| Ammonium sulfate + N-nitrosomorpholine | 14 | 5 |
| Ammonium sulfate (check) | 14 | 100 |
| Ammonium sulfate + N-nitrosomorpholine | 21 | 5 |
| Ammonium sulfate (check) | 21 | 100 |

EXAMPLE 6

Operations are carried out employing the amounts and procedure described in Example 5 but wherein the N-nitroso compound is (a) N-ethyl-N-nitrosoaniline or (b) N-nitrosodiethylamine. The treating and check compositions are employed to treat soil and at various intervals analyses made of the soil for nitrate+nitrite nitrogen to determine the percent nitrification of the added ammonium sulfate. It is found that the ammonium in the soil treated with compositions containing N-ethyl-N-nitrosoaniline or N-nitrosodiethylamine is resistant to nitrification and provides nitrogen available for plant growth over a prolonged period of time, whereas in the soil treated with the check composition containing no N-nitroso compound, the ammonium is readily nitrified and the reduced nitrogen necessary for plant growth is depleted.

EXAMPLE 7

Solid fertilizer compositions were prepared as follows: (1) an inhibitor component was prepared by (a) mixing and grinding together 0.5 gram of N-nitroso compound and 0.75 gram of attapulgite, (b) adding 3.75 grams of pyrophyllite thereto and grinding the resulting mixture until a finely powdered uniform composition was obtained; (2) a fertilizer component was prepared by hammermilling together a 50:40 mixture by weight of ammonium sulfate and pyrophyllite to obtain a fine uniform composition; (3) the inhibitor component and fertilizer component were mixed together on a roller mill to obtain soil treating compositions containing an N-nitroso compound at a concentration of 5 percent by weight based on the nitrogen in the composition.

These compositions were employed to fertilize various beds of sandy loam soil containing essentially no organic material and having a pH of about 8. The soil employed was leached prior to use to remove all nitrate and nitrite nitrogen constituents. A sufficient amount of water was added to the various beds to give the soil in the beds varying moisture content. The beds were fertilized in areas to be planted by providing depressions and adding thereto the fertilizer treating composition and then covering the composition with soil. The amount of composition employed was sufficient to supply 160 parts by weight of nitrogen per million parts by weight of soil. The soil was maintained in the temperature range of from 70° to 80° F. for three weeks. At the end of this period, samples of soil were analyzed for content of nitrate+nitrite nitrogen to determine the extent of nitrification of the added ammonium sulfate. The results were compared with determinations made on a check operation wherein a fertilizer composition containing no N-nitroso compound was employed. The results obtained are set forth in Table IV.

Table IV

| Treating Composition | Interval Following Treatment in Days | Percent Nitrification |
|---|---|---|
| Ammonium sulfate + N-methyl-N-nitrosoaniline | 21 | 13 |
| Ammonium sulfate (check) | 21 | 75 |
| Ammonium sulfate + N-nitrosopiperidine | 21 | 13 |
| Ammonium sulfate (check) | 21 | 75 |

EXAMPLE 8

A solid fertilizer composition was prepared as follows: (1) an inhibitor component was prepared by (a) mixing and grinding together 0.1 gram of N-nitrosopiperidine and 0.15 gram of attapulgite, (b) adding 0.75 gram of pyrophyllite thereto and grinding the resulting mixture until a finely powdered uniform composition was obtained; (2) a fertilizer component was prepared by hammermilling together a 50:45 mixture by weight of ammonium sulfate and pyrophyllite to obtain a fine uniform composition; (3) the inhibitor component and fertilizer component were mixed together on a roller mill to obtain a soil treating composition containing N-nitrosopiperidine at a concentration of 5 percent by weight based on the nitrogen in the composition.

The composition was employed to fertilize beds of sandy loam soil containing essentially no organic material and having a pH of about 8 in an amount sufficient to supply 200 parts by weight of nitrogen per million parts by weight of soil. The treatment was carried out in a manner similar to that described in Example 7. At the end of three weeks, samples of soil were analyzed for content of nitrate+nitrite nitrogen to determine the extent of nitrification of the added ammonium sulfate and compared with the check operation where the fertilizer composition contained no N-nitrosopiperidine. It was found that the soil treated with fertilizer composition containing N-nitrosopiperidine showed only 26 percent nitrification whereas the soil treated with fertilizer composition containing no N-nitrosopiperidine showed 100 percent conversion of ammonium nitrogen to nitrate+nitrite nitrogen.

EXAMPLE 9

Aqueous soil treating compositions containing 100 parts by weight of an N-nitroso compound, 1,000 parts by weight of nitrogen as ammonium sulfate and 500 parts by weight of phosphorus as phosphoric acid was prepared by dispersing a 4 percent (weight per volume of solvent) acetone solution of one N-nitroso compound into an aqueous solution of ammonium sulfate and phosphoric acid.

Pots were prepared for planting with 500 grams of sandy loam soil having a pH of 8 and a 4 percent moisture content. In separate operations, 200 milliliters of the treating compositions prepared as described above were poured over the soil in the pots (an amount equal to about 1 inch of liquid) to supply to the soil an N-nitroso compound in an amount sufficient to give a concentration of 40 parts by weight per million parts by weight of soil and a concentration of nitrogen of 400 parts per million. The treated soil was then covered with paper to reduce evaporation and maintained in the temperature range of from 70° to 80° F.

After a period of 6 weeks, analyses for ammonium nitrogen in parts per million per million parts by weight of soil (p.p.m. in table) were made on soil from some of the pots by distillation of ammonia from the soil in the presence of magnesium oxide, sorption of the distilled ammonia by boric acid, and titrating with a standard solution of hydrochloric acid. The soil in the remainder of the pots was leached with 6 inches of water. Two weeks following the leaching, each pot was planted with 3 milo and 3 tomato plants. After a growth interval of 7 weeks, the tops of the plants were harvested just above ground level and weighed, and the average fresh weights in grams per pot were determined.

A check operation was carried out simultaneously wherein the soil in pots was similarly fertilized with a composition containing the same amount of ammonium sulfate, phosphoric acid and acetone, but no N-nitroso compound.

The recovery of the ammonium nitrogen 6 weeks after treatment and the weights of the plant tops at harvest in both the treating and check operations are set forth in the following table:

*Table V*

| Treating Composition | Ammonium Nitrogen 6 Weeks After Treatment in p.p.m. | Fresh Weight of Plant Tops in Grams Per Pot | |
|---|---|---|---|
| | | Milo | Tomatoes |
| Ammonium sulfate + phosphoric acid + N-methyl-N-nitrosoaniline + acetone | 280 | 46.6 | 27.9 |
| Ammonium sulfate + phosphoric acid + N-nitrosodimethylamine + acetone | 340 | 43.8 | 23.5 |
| Ammonium sulfate + phosphoric acid + acetone (Check) | 30 | 9.5 | 6.8 |

EXAMPLE 10

In an operation carried out with N-methyl-N-nitrosoaniline in a manner similar to that described in Example 9 but in which the milo and tomato plants were planted immediately after the leaching operation and thereafter allowed to grow for 7 weeks, the following results were obtained:

*Table VI*

| Treating Composition | Ammonium Nitrogen 6 Weeks After Treatment in p.p.m. | Fresh Weight of Plant Tops in Grams Per Pot | |
|---|---|---|---|
| | | Milo | Tomatoes |
| Ammonium sulfate + phosphoric acid + N-methyl-N-nitrosoaniline + acetone | 273 | 25.4 | 20.5 |
| Ammonium sulfate + phosphoric acid + acetone (Check) | 13 | 7.7 | 6.4 |

EXAMPLE 11

Concentrate compositions are prepared as follows:

(A) 25 parts by weight of N-nitrosomorpholine, 65 parts of xylene and 10 parts of an alkylated aryl polyether alcohol (Triton X-100) are mechanically mixed together to obtain an emulsifiable liquid composition.

(B) 90 parts by weight of N-ethyl-N-nitroso-p-chloroaniline and 10 parts of an alkyl aryl sulfonate (Acto 700) are mechanically mixed together to obtain a water-dispersible mixture.

These compositions may be dispersed in water to produce aqueous compositions having desirable wetting and penetrating properties. These aqueous compositions are then employed to treat soil in an amount sufficient to distribute the N-nitroso compound therein in effective concentrations. The concentrates may also be dispersed in aqua ammonia to prepare fertilizer compositions.

EXAMPLE 12

Fertilizer compositions are prepared as follows:

(A) N-ethyl-N-nitroso-p-toluidine is mechanically mixed with ammonium phosphate to prepare a reduced nitrogen fertilizer composition containing 5 percent by weight of N-ethyl-N-nitroso-p-toluidine.

(B) N-nitroso-N-methyl-ethylamine is mechanically mixed with ammonium nitrate to prepare a reduced nitrogen fertilizer composition containing 3 percent by weight of N-nitroso-N-methyl-ethylamine.

These fertilizer compositions are distributed in soil to supply the nitrogen requirements for plant nutrition. The treated soil is resistant to nitrification and provides nitrogen available for plant growth over a prolonged period of time.

EXAMPLE 13

The solid fertilizer composition was prepared by (1) grinding together two parts by weight of N-methyl-N-nitrosoaniline with three parts by weight of attapulgite; (2) mixing this mixture with three times its weight of pyrophyllite; and (3) mixing the resulting mixture with nine times its weight of a 50:40 mixture of ammonium sulfate and pyrophyllite. This treating composition contained 1 percent by weight of N-methyl-N-nitrosoaniline and 50 percent by weight of ammonium sulfate.

Pots were prepared for planting with 500 grams of sandy loam soil having a pH of 8 and a 4 percent moisture content. 200 milliliters of a phosphoric acid solution containing 500 parts by weight of phosphorus per million parts of media was poured over soil. The soil was allowed to dry. Thereafter, a hole about ¾ to 1 inch deep was made in the center of each pot, and 2 grams of the solid fertilizer treating composition prepared as described above placed therein. The holes were closed by compressing the soil together. The soil thus treated contained 40 parts by weight of N-methyl-N-nitrosoaniline and 400 parts by weight of nitrogen per million parts by weight of soil. The pots were then covered with paper to reduce evaporation and maintained in the temperature range of from 70° to 80° F. for 5 weeks. At the end of this period, the soil was analyzed for ammonium nitrogen by the method described in Example 9, leached with 6 inches of water, and planted with tomatoes. After a growing period of 7 weeks, the tops of the plants were harvested by cutting them off at the ground level and the average fresh weight in grams per pot determined.

A check operation was carried out simultaneously wherein the soil in the pots was similarly treated with a fertilizer composition but containing no N-methyl-N-nitrosoaniline.

The average weight of the plant tops at harvest in both the treating and check operations as well as the ammonium nitrogen content of the soil prior to leaching and planting is set forth in Table VII.

*Table VII*

| Treating Composition | Ammonium Nitrogen 5 Weeks After Treatment in p.p.m. | Fresh Weight of Tomato Tops in Grams per Pot |
|---|---|---|
| Ammonium sulfate + N-methyl-N-nitrosoaniline | 240 | 25.3 |
| Ammonium sulfate (Check) | 30 | 11.3 |

EXAMPLE 14

Aqueous soil treating compositions were prepared as follows: (1) A nitrification inhibitor component was prepared by making a 20 percent (weight per volume of solvent) acetone solution of N-methyl-N-nitrosoaniline. (2) A fertilizer component was prepared by preparing a 0.1 mixture of an emulsifying agent (Protox 1A-polyethylene glycol 600 oleate) and aqua ammonia (containing 21-23 percent nitrogen). (3) The inhibitor component and fertilizer component were mixed together to obtain a soil treating composition containing 10 percent of the N-methyl-N-nitrosoaniline based on the nitrogen in the composition.

Containers were filled with 600 grams of sandy loam soil having a pH of 8 and a 12 percent moisture content. 0.5 milliliter of the soil treating composition was deposited in the center of the soil in each container (about 3 inches below the surface of the soil). The amount of composition employed was sufficient to supply 150 parts by weight of nitrogen per million parts by weight of soil.

The soil was maintained at 72° F. for 42 days. At the end of this period the soil in the containers was analyzed for ammonium nitrogen by distillation of the ammonia from the soil in the presence of magnesium oxide, sorption of the distilled ammonia by boric acid, and titration with a standard solution by hydrochloric acid. The recovery of ammonium nitrogen from the soil was calculated. The results were compared with check determinations wherein no N-methyl-N-nitrosoaniline but all other components were present in the soil treating composition deposited in the soil. The results obtained are shown in Table VIII.

*Table VIII*

| Concentration of N-Methyl-N-Nitrosoaniline as a Percent of the Nitrogen in the Composition | Recovery of Ammonium Nitrogen Applied in p.p.m. on a Soil Basis |
|---|---|
| 10 | 77 |
| 1 0 | 17 |

1 Check.

EXAMPLE 15

In an operation carried out as described in Example 14 but wherein an inhibitor component was prepared by making a 4 percent (weight per volume of solvent) acetone solution of N-nitrosodimethylamine, and the inhibitor component and a fertilizer component were mixed to obtain a soil treating composition containing 2 percent of N-nitrosodimethylamine based on the nitrogen in the composition, the following results were obtained:

*Table IX*

| Concentration of N-Nitrosodimethylamine as a Percent of the Nitrogen in the Composition | Recovery of Ammonium Nitrogen Applied in p.p.m. on a Soil Basis |
|---|---|
| 2 | 52 |
| 1 0 | 17 |

1 Check.

EXAMPLE 16

Soil treating compositions comprising diammonium phosphate as a source of ammonium ions are prepared as follows:

(A) N-methyl-N-nitroso-o-toluidine is mechanically mixed with diammonium phosphate to prepare a soil treating composition containing 5 percent by weight of the N-methyl-N-nitroso-o-toluidine.

(B) N-methyl-N-nitroso-p-chloroaniline is mechanically mixed with diammonium phosphate to prepare a soil-treating composition containing 4 percent by weight of the N-methyl-N-nitroso-p-chloroaniline.

These fertilizer compositions are distributed in soil to supply the nitrogen requirements for plant nutrition. The treated soil is resistant to nitrification and provides nitrogen available for plant growth over a prolonged period of time.

EXAMPLE 17

Fertilizer compositions comprising ammonium nitrate as the source of reduced nitrogen are prepared in a similar manner to that described in Example 16.

(A) N-nitrosomorpholine is mechanically mixed with ammonium nitrate to prepare a reduced nitrogen fertilizer composition containing 3 percent by weight of the N-nitrosomorpholine.

(B) N-nitrosodiethylamine is mechanically mixed with ammonium nitrate to prepare a reduced nitrogen fertilizer composition containing 2 percent by weight of the N-nitrosodiethylamine.

These fertilizer compositions are distributed in soil to supply the nitrogen requirements for plant nutrition as previously described.

EXAMPLE 18

In operations similar to that described in Example 1, aqueous ammonium fertilizer compositions containing 1000 parts by weight of nitrogen and 10 parts by weight of N-nitrosopyrrolidine or N-nitroso-3-pyrroline (1-nitroso-3-pyrroline) per million parts of aqueous media were prepared by dispersing an 0.8 percent (weight by volume of solvent) acetone solution of N-nitrosopyrrolidine or N-nitroso-3-pyrroline in aqueous ammonium sulfate solution.

The composition so prepared was employed to treat seed beds of sandy loam soil having a pH of 7.3. In the treating operations, the compositions were applied to separate seed beds as soil drench in such manner as to insure substantially uniform distribution of the compositions throughout the soil. The amounts of the compositions employed were sufficient to supply 200 parts by weight of nitrogen and 2 parts by weight of N-nitrosopyrrolidine or N-nitroso-3-pyrroline per million parts by weight of soil. In a check operation, other seed beds similarly prepared were fertilized with a similar aqueous fertilizer composition containing the same amount of acetone and ammonium sulfate but no N-nitroso compound in an amount sufficient to supply the same concentration of nitrogen to the soil as the treating compositions. The soil temperature of all seed beds was maintained at about 70° F. for the period of the determination.

Twenty-eight days after treatment, the seed beds were analyzed for ammonium nitrogen by distillation of the ammonia from the soil in the presence of magnesium oxide, sorption of the distilled ammonia by boric acid, and titration with a standard solution of hydrochloric acid. The recovery of ammonium nitrogen from the soil was calculated for both the treating and check operations and the percent inhibition of nitrification determined. The results are set forth in the following table:

Table X

| N-nitroso compound added to ammonium sulfate: | Percent nitrification after 28 days |
|---|---|
| N-nitrosopyrrolidine | 6 |
| N-nitroso-3-pyrroline | 10 |
| None (check) | 100 |

EXAMPLE 19

In a similar operation, an aqueous ammonium fertilizer composition containing 1000 parts by weight of nitrogen and 25 parts by weight of N-nitrosohexamethyleneimine per million parts of aqueous medium was prepared by dispersing a 2 percent acetone solution of N-nitrosohexamethyleneimine in aqueous ammonium sulfate solution. The composition was employed to treat seed beds of sandy loam soil having a pH of 7.3 in an amount sufficient to supply 200 parts by weight of nitrogen and 5 part by weight of N-nitrosohexamethyleneimine per million parts by weight of soil. In a check operation, other seed beds similarly prepared were fertilized with a similar aqueous fertilizer composition containing the same amount of acetone and ammonium sulfate but no N-nitrosohexamethyleneimine. The check composition was applied in an amount sufficient to supply the same concentration of nitrogen to the soil as the treating composition containing the N-nitroso compound. On determining the degree of nitrification after 28 days, it was found that from soil treated with N-nitrosohexamethyleneimine, there was substantially complete recovery of ammonium nitrogen, whereas in the check operation, there was loss of more than one-half of the ammonium nitrogen or 55 percent nitrification.

EXAMPLE 20

In an operation similar to that described in Example 7, a solid fertilizer composition is prepared wherein the inhibitor is N-nitroso-3-pyrroline and the fertilizer is ammonium sulfate. The treating composition and a check composition comprising ammonium sulfate but containing no N-nitroso compound are applied in separate simultaneous operations to beds of sandy loam soil having a pH of about 7.3 in amounts sufficient to supply about 160 parts by weight of nitrogen per million parts by weight of soil. The soil is maintained in the temperature range of from 70° to 85° F. for four weeks. At the end of this period, samples of soil are analyzed for ammonium nitrogen, and it is found that in the soil treated with N-nitroso-3-pyrroline, there is good decovery of ammonium nitrogen, i.e., good inhibition of nitrification, whereas in the check soil there is substantailly no recovery of ammonium nitrogen or no inhibition of nitrification.

I claim:
1. A method for treating soil to inhibit the conversion therein of ammonium nitrogen to nitrate and nitrite nitrogen which comprises introducing into the soil in an amount sufficient to inhibit nitrification, a composition comprising an N-nitroso compound in intimate admixture with a soil treating adjuvant, said N-nitroso compound being a compound corresponding to the formula

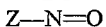

wherein Z is selected from the radicals having the formulas

and

in which A represents a member of the group consisting of lower alkyl, phenyl, tolyl and chlorophenyl, B represents lower alkyl and R represents a member of the group consisting of 1-piperidyl, 1-pyrrolidyl, 4-morpholinyl, 1-pyrrolinyl and hexamethyleneimino, and wherein lower alkyl as above employed is a radical containing from 1 to 2 carbon atoms, inclusive; and wherein said amount is that sufficient to provide a concentration therein of at least 0.2 part by weight per million parts by weight of soil.

2. A method according to claim 1 wherein the soil treating adjuvant is a reduced nitrogen fertilizer.

3. In the fertilization of soil with a reduced nitrogen fertilizer, the step which comprises impregnating soil with an N-nitroso compound in an operation substantially simultaneous with the administration of the reduced nitrogen fertilizer to inhibit nitrification of reduced nitrogen therein, wherein said impregnation is carried out in the growing area of soil in a nitrogen conserving amount, said amount being sufficient to provide a concentration in soil of the N-nitroso compound of at least 0.2 part by weight per million parts by weight of soil; and wherein said N-nitroso compound has the formula

wherein Z is selected from the radicals having the formulas

and

in which A represents a member of the group consisting of lower alkyl, phenyl, tolyl and chlorophenyl, B represents lower alkyl and R represents a member of the group consisting of 1-piperidyl, 1-pyrrolidyl, 4-morpholinyl, 1-pyrrolinyl and hexamethyleneimino, and wherein lower alkyl as above employed is a radical containing from 1 to 2 carbon atoms, inclusive.

4. A fertilizer composition comprising a reduced nitrogen fertilizer and an N-nitroso compound corresponding to the formula

wherein Z is selected from the radicals having the formulas

and

in which A represents a member of the group consisting of lower alkyl, phenyl, tolyl and chlorophenyl, B represents lower alkyl and R represents a member of the group consisting of 1-piperidyl, 1-pyrrolidyl, 4-morpholinyl, 1-pyrrolinyl and hexamethyleneimino, and wherein lower alkyl as above employed is a radical containing from 1 to 2 carbon atoms, inclusive, and wherein the N-nitroso compound is present in a concentration of at least 0.05 percent by weight based on the weight of nitrogen present in the fertilizer as reduced nitrogen.

5. A fertilizer composition comprising a reduced nitrogen fertilizer and N-nitrosopyrrolidine as the N-nitroso compound, wherein said N-nitroso compound is present in a concentration of at least about 0.05 percent by weight based on the weight of nitrogen present in the fertilizer as reduced nitrogen.

6. A fertilizer composition comprising a reduced nitrogen fertilizer and N-nitroso-3-pyrroline as the N-nitroso compound, wherein said N-nitroso compound is present in a concentration of at least about 0.05 percent by weight based on the weight of nitrogen present in the fertilizer as reduced nitrogen.

7. A method for suppressing the nitrification of ammonium nitrogen in growth medium having reduced nitrogen present therein which comprises dispersing N-nitrosopiperidine through soil in concentration sufficient to suppress nitrification, wherein said concentration is from about 0.2 to about 4000 parts by weight per million parts by weight of growth medium.

8. A method for suppressing the nitrification of ammonium nitrogen in growth medium having reduced nitrogen present therein which comprises dispersing N-nitrosopyrrolidine through soil in concentration sufficient to suppress nitrification, wherein said concentration is from about 0.2 to about 4000 parts by weight per million parts by weight of growth medium.

9. A method for suppressing the nitrification of ammonium nitrogen in growth medium having reduced nitrogen present therein which comprises dispersing N-nitroso-3-pyrroline through soil in concentration sufficient to suppress nitrification, wherein said concentration is from about 0.2 to 4000 parts by weight per million parts by weight of growth medium.

10. A method for suppressing the nitrification of ammonium nitrogen in growth medium having reduced nitrogen present therein which comprises dispersing N-nitrosomorpholine through soil in concentration sufficient to suppress nitrification, wherein said concentration is from about 0.2 to about 4000 parts by weight per million parts by weight of growth medium.

11. A method for suppressing nitrification of ammonium nitrogen in growth medium having reduced nitrogen present therein which comprises dispersing N-methyl-N-nitrosoaniline through soil in concentration sufficient to suppress nitrification, wherein said concentration is from about 0.2 to about 4000 parts by weight per million parts by weight of growth medium.

12. A method for suppressing nitrification of ammonium nitrogen in growth medium having reduced nitrogen present therein which comprises dispersing N-nitrosodimethylamine through soil in concentration sufficient to suppress nitrification, wherein said concentration is from about 0.2 to about 4000 parts by weight per million parts by weight of growth medium.

References Cited by the Examiner
UNITED STATES PATENTS

| | | | |
|---|---|---|---|
| 2,396,665 | 3/1946 | Ladd | 71—3 XR |
| 2,922,793 | 1/1960 | Rockett | 71—3 XR |
| 2,970,939 | 2/1961 | Maitlen. | |
| 2,996,371 | 8/1961 | Seifter et al. | 71—27 |
| 3,062,887 | 11/1962 | Levering et al. | |

DONALL H. SYLVESTER, *Primary Examiner.*

MAURICE A. BRINDISI, A. LOUIS MONACELL,
*Examiners.*